United States Patent

Cupo

[11] Patent Number: 5,115,452
[45] Date of Patent: May 19, 1992

[54] PHASE JITTER CORRECTION ARRANGEMENT

[75] Inventor: Robert L. Cupo, Eatontown, N.J.

[73] Assignee: AT&T Bell Laboratories, Murray Hill, N.J.

[21] Appl. No.: 562,050

[22] Filed: Aug. 2, 1990

[51] Int. Cl.$^5$ ............................................. H04L 25/08
[52] U.S. Cl. .................................... 375/14; 375/118; 328/155
[58] Field of Search ..................... 375/12, 14, 97, 106, 375/118; 328/55, 56, 155; 364/724.15

[56] References Cited

U.S. PATENT DOCUMENTS

| | | | |
|---|---|---|---|
| 4,253,184 | 2/1981 | Gitlin et al. | 375/14 |
| 4,320,526 | 3/1982 | Gitlin | 375/14 |
| 4,777,640 | 10/1988 | Turner et al. | 328/155 |
| 4,847,864 | 7/1989 | Cupo | 375/14 |
| 4,953,186 | 8/1990 | Levy et al. | 375/14 |

FOREIGN PATENT DOCUMENTS 0097743 5/1985 Japan ................................ 364/724.15

Primary Examiner—Benedict V. Safourek
Attorney, Agent, or Firm—David R. Padnes

[57] ABSTRACT

In a communications system, a transmitted signal is typically impaired by phase jitter attributed to power line harmonics and ringing voltages present in a communications channel. In order to properly recover the transmitted signal, the phase jitter in a received signal needs to be eliminated. To this end, an infinite-impulse-response (IIR) filter arrangement is employed in a receiver to estimate the phase jitter and is followed by a demodulator which substantially removes the jitter based on the estimate. The transfer function of this IIR filter arrangement is a function of the autocorrelation of a phase error, the latter being indicative of the difference between the phase jitter in the received signal and the jitter estimate.

24 Claims, 2 Drawing Sheets

PHASE JITTER CORRECTION ARRANGEMENT

TECHNICAL FIELD

This invention relates to a communications system and more particularly to an infinite-impulse-response (IIR) filter arrangement which corrects phase jitter.

BACKGROUND OF THE INVENTION

In a communications system where signals are transmitted over a communications channel, the transmitted signals are normally corrupted by imperfections in the channel. In order to properly recover the transmitted signals, circuits which correct various signal impairments are employed in a receiver. Phase jitter is one such signal impairment. It is typically modeled as a set of sinusoids of different frequencies and is attributed to power line harmonics and ringing voltages present in the channel.

Phase-jitter-correction techniques typically call for an estimation of the phase jitter before the jitter can be effectively removed. One such technique involves the use of an adaptive finite-impulse-response (FIR) filter for the phase jitter estimation, as described in U.S. Pat. No. 4,320,526 issued Mar. 16, 1982 to R. D. Gitlin, which is hereby incorporated by reference. Disadvantageously, such an FIR filter is relatively slow in converging on each of the phase jitter frequencies during an adaptation process. Moreover, this FIR filter does not provide the estimate accurate enough to effect a substantial removal of the phase jitter.

Another technique involves the use of an adaptive IIR filter for estimating the phase jitter, as described in U.S. Pat. No. 4,847,864 issued Jul. 11, 1989 to R. L. Cupo, which is hereby incorporated by reference. The coefficients of such an IIR filter are selected, using a well-known least-mean-square (LMS) optimization method, to minimize a phase error indicative of the difference between the phase jitter estimate and the actual phase jitter present in the received signal. Stemming from certain limitations of the optimization method used, this IIR filter can only provide an estimate, although accurate, of a particular frequency component of the phase jitter. However, in practice, the phase jitter oftentimes consists of a plurality of frequency components. This being so, in order to remove the phase jitter completely, a multiplicity of these IIR filters (i.e., one filter for each frequency component) must be incorporated in the receiver. Notwithstanding such, the actual number of jitter frequency components incurred in a channel varies from one channel to another and, therefore, cannot be determined in advance. Overestimating the number of the jitter frequency components results in incorporating too many such filters and adds an unnecessary, substantial cost to the system. On the other hand, underestimating the number results in too few such filters and undesirably degrades the system's performance.

Accordingly, it is desirable to have a phase-jitter-correction arrangement capable of removing all of the jitter frequency components from the received signal, regardless of their number.

SUMMARY OF THE INVENTION

The present invention overcomes the prior art limitations by minimizing phase error using a technique which, unlike the LMS method, makes use of the autocorrelation of the phase error. This phase error is indicative of the difference between the phase jitter present in a received signal and an estimate of the jitter. In accordance with the present invention, such a phase jitter estimate is provided by an IIR filter arrangement whose transfer function is derived from the autocorrelation of the phase error.

Advantageously, the inventive filter arrangement expeditiously adapts to a phase jitter having a plurality of frequency components and provides an accurate phase jitter estimate, which is conducive to a substantial removal of the jitter.

DETAILED DESCRIPTION

Figure 1:
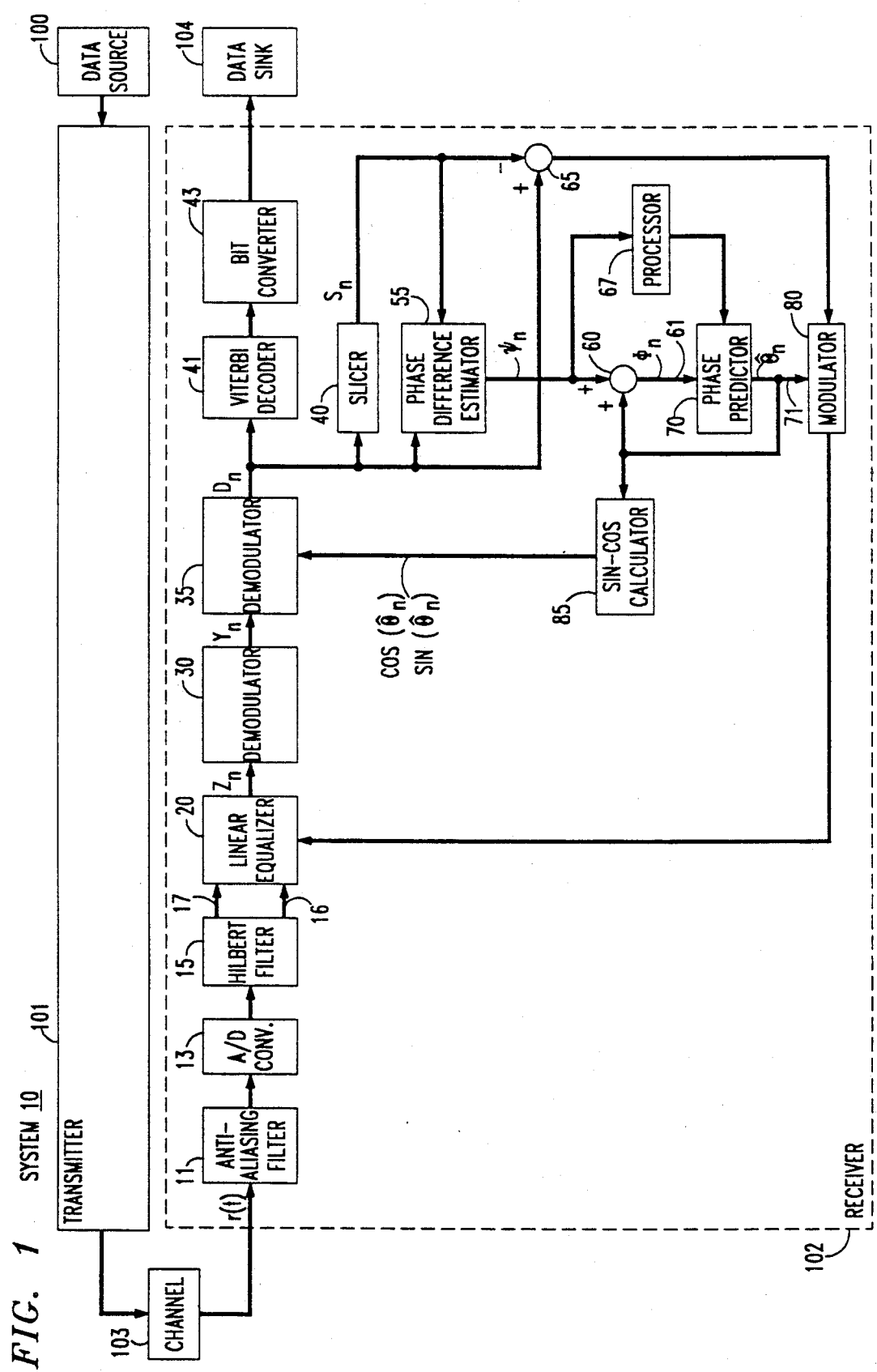
FIG. 1 illustrates a block diagram of a communications system embodying the principles of the present invention.

FIG. 1 illustrates system 10 which embodies the principles of the present invention. In system 10, data source 100 is configured to communicate information to data sink 104. For example, data source 100 may be a mainframe, a minicomputer, etc., and data sink 104 may be a data terminal, a printer, and such. Digital bits representative of the information from data source 100 are fed to transmitter 101 of conventional design. These bits are collected in transmitter 101 in groups of twenty-eight. Each group is trellis coded into 8-dimensional symbols selected from a predetermined signal constellation (not shown). In a well known manner, each 8-dimensional symbol is mapped to four 2-dimensional signal points, which are transmitted as four respective quadrature-amplitude-modulated (QAM) signals, each having a spectrum centered at a carrier frequency $\omega_c$. During each baud interval of $T=1/2742.8571$ sec, one such QAM signal is transmitted through channel 103. Thus the digital bits are communicated at a rate of $T/4=685.7142$ 8-dimensional symbols per second, or a data transmission rate of 19.2 Kbps.

In this particular illustrative embodiment, channel 103 is furnished by a standard private line network. The transmitted signal is corrupted in channel 103 by various impairments including phase jitter. The present invention is directed to the correction for such phase jitter. Phase jitter normally includes a plurality of frequency components and, in fact, it may be mathematically expressed as follows:

$$\theta(t) = \sum_{q=0}^{Q} a_q \sin \omega_q t. \tag{1}$$

where Q is the number of frequency components in phase jitter $\theta(t)$ at time t, $a_q$ is the phase jitter amplitude of the $q^{th}$ sinusoidal component, and $\omega_q$ is the frequency of that component. Phase jitter is mainly attributed to power line harmonics and ringing voltages present in channel 103. For example, the fundamental frequency of power line voltages, i.e. 60 Hz, is usually the dominant cause of the phase jitter. In certain situations, the second harmonic of the fundamental frequency, i.e., 120 Hz, also substantially contributes to the phase jitter. It is noteworthy, however, that the phase jitter frequencies need not be harmonically related.

Receiver 102 receives a signal r(t) which represents the transmitted signal subjected to impairments including phase jitter. Anti-aliasing filter 11, which is a standard, low-pass filter, filters out energy in the signal r(t) at frequencies above 4000 KHz. The filtered signal is supplied to A/D converter 13 which generates passband samples of the received signal at a rate of 4/T samples per second. The passband samples are fed to Hilbert filter 15 which provides, during each baud interval, a pair of signals representing the Hilbert transform of the passband samples on leads 16 and 17. These leads extend to the input of linear equalizer 20 which is of conventional design. Linear equalizer 20 may be of the type disclosed in U.S. Pat. No. 3,868,603 issued Feb. 25, 1975 to Guidoux, hereby incorporated by reference. It is also referred to as a "fractionally spaced" equalizer since it receives and processes more than one input during each symbol interval. The function of linear equalizer 20 is to eliminate, from the passband samples, intersymbol interference caused by channel 103.

The output of linear equalizer 20 is a complex signal and is generated once per baud interval. The complex signal generated during the $n^{th}$ baud interval is denoted $Z_n$. This complex signal $Z_n$, including a real component $z_n$ and an imaginary component $\hat{z}_n$, is passed to demodulator 30. In a well known manner, demodulator 30 demodulates the passband signal $Z_n$ based on the aforementioned carrier frequency $\omega_c$ to generate a complex baseband signal $Y_n$ having real and imaginary components $y_n$ and $\hat{y}_n$.

It should be pointed out at this juncture that the baseband signal $Y_n$ is subjected to the aforementioned phase jitter impairment. In order to correct for the phase jitter, a second demodulator 35 demodulates the signal $Y_n$ as if its components, $y_n$ and $\hat{y}_n$, had respectively been modulated by $\cos(\theta(nT))$ and $\sin(\theta(nT))$ in channel 103. Demodulator 35 receives the values of $\cos(\hat{\theta}_{n-1})$ and $\sin(\hat{\theta}_{n-1})$ which are provided by sin-cos calculator 85. Here, $\hat{\theta}_{n-1}$ is a predictive estimate of the phase jitter $\theta(nT)$ present in $Y_n$. This estimate is supplied by phase predictor 70, operating in conjunction with phase difference estimator 55. To this end, phase difference estimator 55 provides a phase error signal having a value $\psi_n$ which is indicative of the difference between $\theta(nT)$ and $\hat{\theta}_{n-1}$. As shown in the following formula, $\psi_n$ is a function of $D_n$ and $S_n$, which are respectively the complex values of the signals from demodulator 35 and slicer 40.

$$\psi_n = Im\left[\frac{D_n S_n^*}{|S_n|^2}\right] \quad (2)$$

where Im denotes the imaginary component of its argument; $S_n^*$ is the complex conjugate of $S_n$; and $|S_n|$ represents the modulus of $S_n$.

The operation of phase predictor 70 is fully described hereinbelow. It suffices to know for now that phase predictor 70 is an infinite-impulse-response (IIR) filter having a plurality of reflection coefficients. (By definition, an IIR filter is a filter whose impulse response has an infinite duration.) The values of these reflection coefficients are provided by processor 67 after an initialization process occupying the first N baud intervals. (N is experimentally determined to be on the order of 100 and is equal to 64 in this instance.) During this process, processor 67 determines the coefficient values based on $\psi_1, \psi_2 \ldots \psi_N$ collected from phase difference estimator 55.

The output of phase predictor 70, $\hat{\theta}_{n-1}$, is fed back to the phase predictor through adder 60 which adds the value of $\psi_n$ to the value of $\hat{\theta}_{n-1}$. The resulting sum, $\phi_n$, is supplied to phase predictor 70 for predicting the value of $\theta((n+1)T)$. In the steady state, the real and imaginary components of the complex signal $D_n$, respectively denoted as $d_n$ and $\hat{d}_n$, are virtually free of the phase jitter, and the phase error signal value, $\psi_n$, at the output of phase difference estimator 55 is substantially zero.

Slicer 40 provides the complex signal $S_n$ whose real and imaginary components ($s_n$ and $\hat{s}_n$) are the quantized versions of $d_n$ and $\hat{d}_n$. $S_n$ represents the so-called "tentative" decisions as to what the transmitted 2-dimensional signal points actually were. These tentative decisions are used for equalizer adaptation purposes. To this end, subtracter 65 provides a complex baseband error signal by subtracting the real and imaginary components of $S_n$ from the corresponding components of $D_n$. The resulting real and imaginary components are respectively modulated by modulator 80 with quadrature carriers, $\cos(\omega_c nT + \hat{\theta}_{n-1})$ and $\sin(\omega_c nT + \hat{\theta}_{n-1})$. The output of modulator 80 is, accordingly, a complex passband error signal which is supplied to linear equalizer 20 for updating its coefficients in a conventional manner.

Based on a sequence of the signals provided by demodulator 35, Viterbi decoder 41, in a standard way, determines the most likely sequence of 8-dimensional symbols which were communicated from transmitter 101. Bit converter 43 translates each of these 8-dimensional symbols into a group of twenty-eight digital bits which the symbol represents. The digital bits are thereupon received by data sink 104.

We turn now to a full description of phase predictor 70. In accordance with the present invention, phase predictor 70 is an IIR filter having a transfer function $H(z)$ as follows:

$$H(z) = \frac{Gz^{-1}}{1 + \sum_{i=1}^{p} \beta_i z^{-i}}, \quad (3)$$

where G is the square root of the total energy in the phase error signal whose value is $\psi_n$; and p is the order of the IIR filter. (In this particular embodiment, p is experimentally determined to be 10.) The values of $\beta_i$'s, for $1 \leq i \leq p$, are selected so as to minimize $\psi_n$ to substantially zero. This minimization is achieved by using the Durbin recursion technique as set forth in J. Makhoul "Linear Prediction: A Tutorial Review," *Proc. IEEE*, vol. 63, April 1975, pages 561-580, which is hereby incorporated by reference. In accordance with this technique, the values of $\beta_i$'s are determined based on the autocorrelation of $\psi_n$. Specifically, they are obtained by solving the following equations (4) through (8) recursively for $i = 1, 2, \ldots, p$. Given $$E_0 = R(0) = \sum_{n=0}^{N} \psi_n^2,$$

$$R(i) = \sum_{n=0}^{N} \psi_n \psi_{n-i}, \quad (4)$$

$$k_i = -\left[R(i) + \sum_{j=1}^{i-1} a_j^{(i-1)} R(i-j)\right]/E_{i-1}, \quad (5)$$

-continued
$$a_i^{(i)} = k_i,\qquad (6)$$

$$a_j^{(i)} = a_j^{(i-1)} + k_i a_{i-j}^{(i-1)}, \text{ where } 1 \leq j \leq i - 1; \qquad (7)$$

$$E_i = (1 - k_i^2) E_{i-1} \qquad (8)$$

and finally $\beta_i = a_i^{(p)}$ for $i = 1, 2, \ldots, p$. It should be pointed out that R(i) is the autocorrelation of $\psi_n$. It should also be pointed out at this juncture that the aforementioned G in equation (3) is defined as follows:

$$G = \sqrt{E_0 + \sum_{i=1}^{p} \beta_i R(i)} \;. \qquad (9)$$

Figure 2:
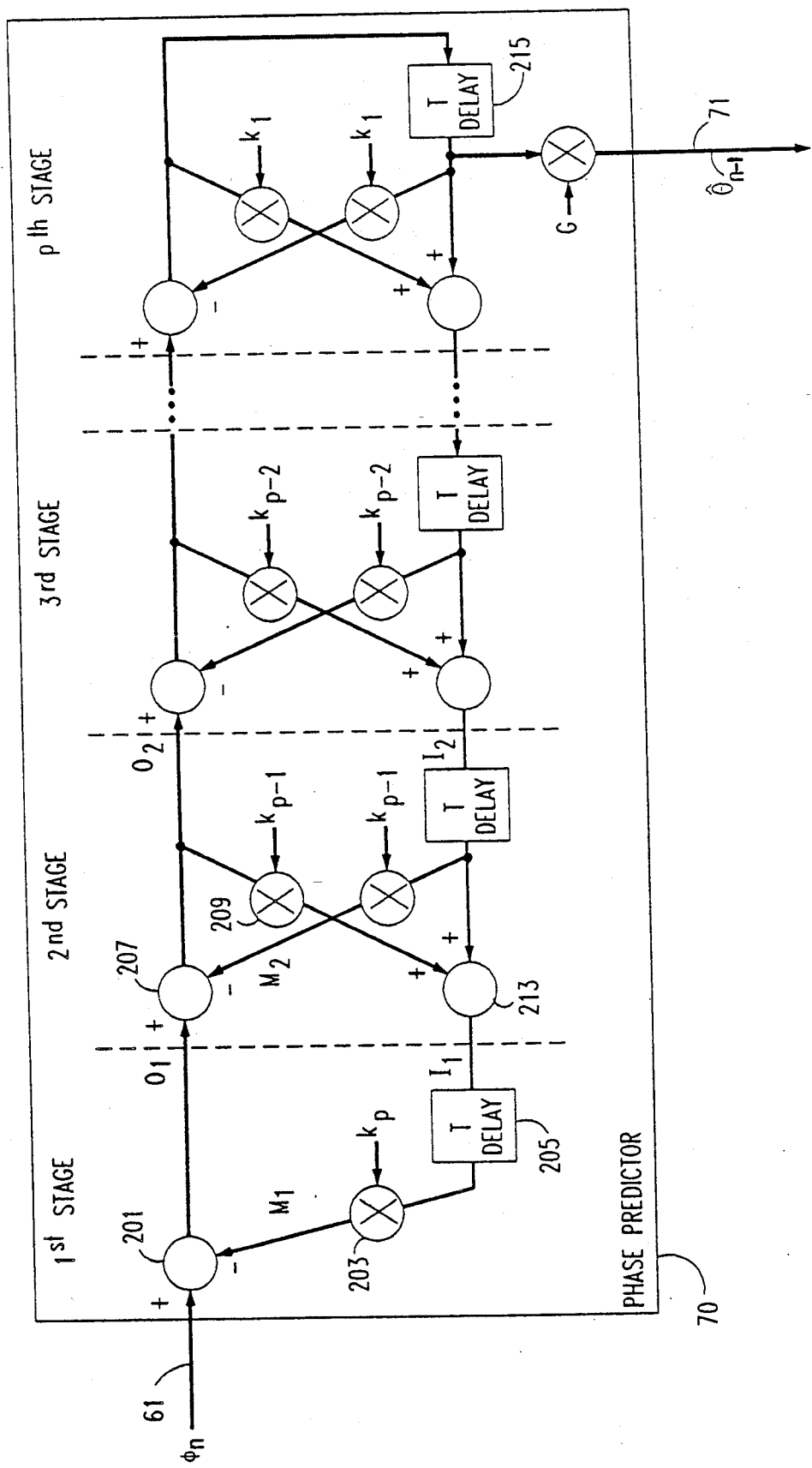
FIG. 2 illustrates a block diagram of a phase predictor for estimating phase jitter present in a received signal in the communications system of FIG. 1.

With the foregoing in mind, we now turn to FIG. 2 which is a realization of phase predictor 70. In this preferred embodiment, phase predictor 70 is realized as a lattice structure. Advantageously, this lattice structure incurs less quantization error than other realizations of phase predictor 70 such as a standard direct form. This quantization error is attributed to a truncation or rounding off of the products formed by multiplications involved in each realization.

As shown in FIG. 2, phase predictor 70 in the lattice structure includes reflection coefficients, $k_i$'s (where $1 \leq i \leq p$), as opposed to the aforementioned $\beta_i$'s which are actually the tap coefficients used in the standard direct form. A careful reading reveals that these $k_i$'s are the byproducts of the above-described recursive process through which the $B_i$'s are determined. Specifically, in each iteration of the process, equation (5) yields a $k_i$. In fact, processor 67 of FIG. 1 runs this recursive process to provide a set of $k_i$'s for phase predictor 70 during the initialization process.

Specifically, phase predictor 70 includes p stages. A signal having a value $\phi_n$ on lead 61 is applied to the first stage of phase predictor 70 wherein subtracter 201 subtracts $M_1$ from $\phi_n$. $M_1$ is derived from $I_1$ which is provided by the second stage of phase predictor 70. Specifically, $M_1$ is achieved by delaying $I_1$ for a period of T with delay element 205 and then scaling, via multiplier 203, the delayed version of $I_1$ by a reflection coefficient of $k_p$. The output of subtracter 201, denoted $O_1$, is applied to the second stage wherein subtracter 207, like subtracter 201, subtracts $M_2$ from $O_1$. Similarly, $M_2$ is achieved by delaying $I_2$, which is provided by the third stage of phase predictor 70, for a period of T and then scaling the delayed version of $I_2$ by a reflection coefficient of $k_{p-1}$. The output of subtracter 207, denoted $O_2$, is applied to the third stage of phase predictor 70. $O_2$ is also scaled by a reflection coefficient of $k_{p-1}$ via multiplier 209. Adder 213 sums the scaled version of $O_2$ and the delayed version of $I_2$ to form the aforementioned $I_1$.

The third through $(p-1)^{th}$ stages of phase predictor 70 are structurally similar to the second stage as just described. The only difference lies in the value of the reflection coefficient used in each of those stages. Specifically, the reflection coefficient in the $m^{th}$ stage has a value of $k_{p-m+1}$, where $3 \leq m \leq -1$. The $p^{th}$ stage, i.e., the last stage of phase predictor 70, is also very similar to the second stage. It differs from the second stage in that, besides using a different value of reflection coefficient $k_1$, the output of the $p^{th}$ stage is looped back to delay element 215 in that same stage. Phase predictor 70 generates, on to lead 71, a signal of the aforementioned value $\hat{\theta}_{n-1}$, which is formed by scaling the output of delay element 215 by a factor G.

The foregoing merely illustrates the principles of the present invention. It will thus be appreciated that those skilled in the art will be able to devise numerous other arrangements which embody the principles of the invention and are thus within its spirit and its scope. For example, although the disclosed system is embodied in the form of various discrete electronic building blocks and components, the invention could equally as well be embodied in a system in which the functions of any one or more of those building blocks and components or indeed, all of the functions thereof, are realized, for example, by one or more appropriately programmed processors.

I claim:

1. Apparatus for estimating phase jitter in a received signal, said apparatus comprising
    means for receiving a phase error signal which is representative of a difference between said phase jitter and an estimate thereof, and
    means for forming said estimate in response to said phase error signal, said forming means having an impulse response of infinite duration and also having a transfer function which is determined by an autocorrelation of said phase error signal.

2. Receiver apparatus for processing a signal which includes phase jitter, said receiver apparatus comprising
    means for generating a phase error indicative of a difference between said phase jitter and an estimate thereof,
    means for providing said estimate, said providing means having an impulse response of infinite duration and also having a transfer function which is determined by an autocorrelation of said phase error, and
    means for removing said phase jitter from said signal in response to said estimate.

3. The apparatus of claim 2 wherein said removing means further includes means for demodulating said signal using said phase jitter estimate as a carrier frequency.

4. The apparatus of claim 2 wherein said transfer function is determined using a recursive technique.

5. The apparatus of claim 2 wherein said providing means is realized as a lattice structure.

6. Apparatus for receiving a signal, said apparatus comprising
    means for demodulating samples of said signal which include phase jitter, said demodulating means using an estimate of said phase jitter as a carrier frequency so that said phase jitter is removed from said samples, and
    means for providing said estimate in response to a phase error signal, said providing means having an impulse response of infinite duration and also having a transfer function which is a function of an autocorrelation of a phase error, said phase error being indicative of a difference between said estimate and said phase jitter.

7. The apparatus of claim 6 wherein said transfer function is determined using a recursive technique.

8. The apparatus of claim 6 wherein said providing means is realized as a lattice structure.

9. A communications system having a transmitter which transmits a signal, said communications system comprising means for recovering said signal based on samples of a received signal associated with said signal, said samples including phase jitter, means for generating an estimate of said phase jitter in response to a received signal sample, said generating means having an impulse response of infinite duration and also having a transfer function which is a function of an autocorrelation of a phase error, said phase error being indicative of a difference between said estimate and said phase jitter, and means for removing said phase jitter from said samples in response to said estimate.

10. The communications system of claim 9 wherein said removing means further includes means for demodulating said samples using said estimate as a carrier frequency.

11. The communications system of claim 9 wherein said transfer function is determined using a recursive technique.

12. The communications system of claim 9 wherein said generating means is realized as a lattice structure.

13. A method for estimating phase jitter in a received signal, said method comprising the steps of receiving a phase error signal which is representative of a difference between said phase jitter and an estimate thereof, and forming said estimate using a filter having an impulse response of infinite duration and also having a transfer function which is determined by an autocorrelation of said phase error signal.

14. A method for use in receiver apparatus for processing a signal which includes phase jitter, said method comprising the steps of generating a phase error indicative of a difference between said phase jitter and an estimate thereof, providing said estimate using a filter whose impulse response has an infinite duration and whose transfer function is a function of an autocorrelation of said phase error, and removing said phase jitter from said signal in response to said estimate.

15. The method of claim 14 wherein said removing step includes the step of demodulating said signal using said phase jitter estimate as a carrier frequency.

16. The method of claim 14 wherein said transfer function is determined using a recursive technique.

17. The method of claim 14 wherein said filter is realized as a lattice structure.

18. A method for use in signal-receiving apparatus, said method comprising the steps of demodulating first and second samples of said signal which include phase jitter, said first sample preceding said second sample in time, said demodulating means using an estimate of said phase jitter as a carrier frequency so that said phase jitter is removed from said second sample, and providing said estimate in response to the first sample using a filter whose impulse response has an infinite duration and whose transfer function is a function of an autocorrelation of a phase error, said phase error being indicative of a difference between said estimate and said phase jitter.

19. The method of claim 18 wherein said transfer function is determined using a recursive technique.

20. The method of claim 18 wherein said filter is realized as a lattice structure.

21. A method for use in a communications system having a transmitter which transmits a signal, said method comprising the steps of recovering said signal based on samples of a received signal associated with said signal, said samples including phase jitter, generating an estimate of said phase jitter in response to a received signal sample using a filter whose impulse response has an infinite duration and whose transfer function is a function of an autocorrelation of a phase error, said phase error being indicative of a difference between said estimate and said phase jitter, and removing said phase jitter from said samples in response to said estimate.

22. The method of claim 21 wherein said removing step further includes the step of demodulating said samples using said estimate as a carrier frequency.

23. The method of claim 21 wherein said transfer function is determined using a recursive technique.

24. The method of claim 21 wherein said filter is realized as a lattice structure.

* * * * *